United States Patent [19]

Winowiski et al.

[11] Patent Number: 4,952,415

[45] Date of Patent: Aug. 28, 1990

[54] CARBOXYLIC POLYMER ANIMAL FEED BINDER

[75] Inventors: Thomas S. Winowiski, Mosinee; Stephen Y. Lin, Wausau, both of Wis.

[73] Assignee: Daishowa Chemicals Inc., Rothschild, Wis.

[21] Appl. No.: 298,847

[22] Filed: Jan. 18, 1989

Related U.S. Application Data

[63] Continuation of Ser. No. 114,624, Oct. 28, 1987, abandoned.

[51] Int. Cl.$^5$ .................................... A23K 1/00
[52] U.S. Cl. ..................... 426/285; 426/302; 426/454; 426/516; 426/623; 426/630; 426/807
[58] Field of Search ............ 426/302, 285, 72, 74, 426/272, 635, 623, 630, 454, 807; 424/81

[56] References Cited

U.S. PATENT DOCUMENTS

| | | |
|---|---|---|
| 2,905,558 | 9/1959 | Adams . |
| 3,644,113 | 2/1972 | Lane et al. .......................... 426/285 |
| 4,276,077 | 6/1981 | Zaslavsky et al. . |
| 4,374,738 | 2/1983 | Kelley . |

FOREIGN PATENT DOCUMENTS 1168515  7/1985  U.S.S.R. .

OTHER PUBLICATIONS

"Study on the Graft Copolymerization of Lignosulfonate and Acrylic Monomers" by Chen et al., published in *Journal of Applied Polymer Science*, vol. 25, pp. 2211–2220 (1980).

*Primary Examiner*—R. B. Penland
*Attorney, Agent, or Firm*—Andrus, Sceales, Starke & Sawall

[57] ABSTRACT

An animal feed composition and method of compounding animal feed utilizing a carboxylic containing compound as a binder. The carboxylic containing compound comprises a polymer, copolymer or salts of the polymer or copolymer having a monomer unit of the general formula —(RCHCR'COOH)$_n$— where R is hydrogen or a carboxylic acid and R' is hydrogen or an alkyl group. One specific embodiment of the binder comprises a copolymer of a sulfonated lignin material and a monomer, polymer or polymer salt of the above general formula. The binder is incorporated with the feed in an amount of from about 0.025% to about 4.0% on a dry weight basis.

18 Claims, No Drawings

CARBOXYLIC POLYMER ANIMAL FEED BINDER

This application is a continuation of copending application Ser. No. 07/114,624 filed Oct. 28, 1987, now abandoned.

BACKGROUND OF THE INVENTION

This invention relates to animal feeds, and more particularly to an improved animal feed composition and method of compounding animal feed utilizing a carboxylic containing compound as a binder.

The manufacture of animal feeds depends heavily on the use of low cost by-product ingredients. These ingredients are frequently dusty, unpalatable, of low density, and have inadequate nutrient profile. To correct these shortcomings, ingredients are combined into a mixture to provide adequate energy and protein, and supplemented with the necessary vitamins, minerals, and amino acids to meet the nutrient requirements of the animals. These mixtures are then typically processed via known extrusion and/or compaction techniques to form pellets, blocks or briquettes in order to eliminate ingredient segregation, increase bulk density, reduce dust, mask unpalatable ingredients, and reduce wastage. All of these benefits are dependent upon the pellet, block or briquette maintaining its physical integrity.

Since feed formulations are typically dictated by the cost and availability of byproduct ingredients, it is not always possible to produce durable pellets, blocks or briquettes. Some ingredients such as animal fat, meat meal, ground corn, and oat hulls, have poor binding qualities and may even be antagonistic to binding. When such ingredients are used a binder is often included to insure that a durable pellet, block or briquette is produced. Typically, lignosulfonate, a naturally occurring polymer generated via sulfite digestion of wood in the manufacture of pulp and paper, is applied to the feed at a rate of 25 to 50 lbs. per ton of feed. This level of application reduces fines from 25% to 60% versus pellets, blocks or briquettes containing no binder.

Lignosulfonates contain no protein and little metabolizable energy and are therefore unpopular in nutritionally dense formulations, e.g. poultry feeds and pig starter feeds, due to the diluting effect they have on the feed. In addition, lignosulfonates are thought to be unpalatable to piglets and young pigs, limiting their use in pig starter feeds. Manufacturers of poultry feeds and pig starter feeds would therefore benefit from a binder which could perform as well as a lignosulfonate but could be applied at a lower inclusion rate, namely, at 5 pounds per ton of feed or less. Such a binder would reduce the diluting effect of the binder, and correspondingly increase the available nutrition to be supplied to the animal in its feed.

So called "low inclusion" binders have been introduced to the feed industry to fill this niche. These include Nutraflex, a protein colloid manufactured by Swift Co., Hercule's Cellulose Gum, a carboxymethyl cellulose manufactured by Hercules Inc., Production Aid ES, a lignosulfonate-starch blend manufactured by Cravac Industries, and Basfin, a urea-formaldehyde manufactured by BASF. Each of these products provides some improvement in pellet, block or briquette quality, but none can produce a 25% to 60% reduction in fines as occurs when lignosulfonates are used at their recommended levels.

In addition to the above noted "low inclusion" binders, there are several disclosures relating to copolymers of lignosulfonate and acrylic compounds useful for various applications. For example, U.S. Pat. No. 4,374,738 discloses a water-based drilling mud composition which comprises an aqueous disperson of clay material and a graft copolymer of lignosulfonate and an acrylic compound including acrylic acid, acrylonitrile and acrylamide. In U.S. Pat. No. 4,276,077, a method is revealed for improving a soil structure by stabilization of aggregates obtained from crude lignosulfonate and a monomer selected from among acrylonitrile, vinyl acetate, acrylamide or combinations thereof. Soviet Union Patent No. 1,168,515 (July 23, 1985) discloses the use of a copolymer of lignosulfonate and (meth)acrylic acid for inhibiting the deposit of inorganic salts. A study of graft copolymerization of lignosulfonate acrylic compounds was reported in the *Journal of Applied Polymer Science*, Vol. 25 : 2211–2220 (1980). These cited disclosures, however, failed to recognize the use of a copolymer of lignosulfonate and a carboxylic containing compound such as an acrylic polymer as a binder in animal feeds.

It is therefore an object of this invention to provide an effective binder for animal feed compositions.

It is another object of this invention to provide an animal feed binder obtained from sulfonated lignin materials.

It is still another object of this invention to provide a binder which, when mixed with animal feed at 5 pounds per ton of feed or less, will reduce fines by at least about 20% to about 25% versus untreated feed.

Other objects and features of this invention may be evident in the following detailed disclosure.

SUMMARY OF THE INVENTION

These and other objects of the invention are accomplished by an animal feed composition and method of compounding an animal feed utilizing a carboxylic containing compound as a binder. The carboxylic containing compound comprises a polymer, copolymer or salts of said polymer or copolymer having a monomer unit of the general formula —(RCHCR'COOH)$_n$—where R is hydrogen or carboxylic acid and R' is hydrogen or an alkyl group. The binder may be incorporated with the feed in an amount of from about 0.025% to about 4.0% on a dry weight basis.

In one form, the binder is a polymer or a salt of said polymer having a monomer unit of the above general formula. Preferably, the polymer is selected from the group consisting of polyacrylic acid, polymaleic acid, polymethacrylic acid, mixtures thereof, and salts thereof. In this form, the binder is incorporated with the animal feed in an amount from about 0.025% to about 2.0% on a dry weight basis.

In another form, the binder is a copolymer of at least two different monomers or a salt of said monomers with at least one of sad monomers having a monomer unit of the above general formula. In one specific form, the binder comprises a copolymer of a sulfonated lignin material and a polymer or a salt of said polymer having a monomer un[t of the above general formula. Preferably, the polymer is selected from the group consisting of polyacrylic acid, polymaleic acid, polymethacrylic acid, mixtures thereof, and salts thereof. In this latter form utilizing a sulfonated lignin material, the binder is incorporated with the animal feed in an amount of from about 0.025% to about 4.0% on a dry weight basis. The sulfonated lignin material may be a lignosulfonate, a sulfonated lignin, and mixtures thereof. Also, the sulfonated lignin material may be in the form of a sodium, potassium, calcium, lithium or ammonium salt.

The binder may be incorporated with the animal feed in solid form by mixing therein, or in aqueous form by being sprayed thereon. Subsequently, the mixture may be formed into discrete shapes by extrusion or compacting techniques.

DESCRIPTION OF THE PREFERRED EMBODIMENT

An animal feed composition and method of compounding animal feed utilizing a carboxylic containing compound as a binder. The carboxylic containing compound comprises a polymer, copolymer or salts of said polymer or copolymer having a monomer unit of the general formula —$(RCHCR'COOH)_n$—where R is hydrogen or carboxylic acid and R' is hydrogen or an alkyl group. The binder may be incorporated with the feed in an amount of from about 0.025% to about 4.0% on a dry weight basis.

The animal feed may be any protein containing meal. Such protein containing meals are typically primarily composed of corn, soya or a corn/soya mix. For example, typical commercially available products include Egg Maker Complete, a poultry feed product of Land O'Lakes AG Services, as well as Country Game & Turkey Grower, a product of Agway, Inc. Both of these commercially available products are typical examples of animal feeds with which the present binder may be incorporated. In addition, the binder may be effectively incorporated directly into ingredients e.g. corn meal, soya or mixtures thereof. Thus, any type of protein containing meal may be utilized as the base mix to which the binder of the present invention may be incorporated.

The carboxylic containing compound may comprise a polymer or a salt of said polymer having a monomer unit of the general formula —$(RCHCR'COOH)_n$— where R is hydrogen or carboxylic acid and R' is hydrogen or an alkyl group. As such, the polymer may comprise, for example, polyacrylic acid, polymaleic acid, polymethacrylic acid, mixtures thereof, and salts thereof. The following represent the general formula for the repeating monomer unit of the above referred to polymers and polymer salts.

POLYACRYLIC ACID

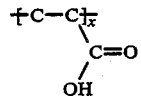

POLYMALEIC ACID

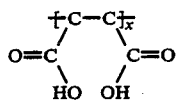

POLYMETHACRYLIC ACID

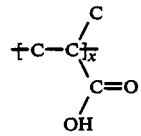

The binder is incorporated directly with the feed either as a solid material with subsequent mechanical mixing, or in an aqueous form by being sprayed thereon and subsequently mixed therein. The polymer binder is incorporated with the feed in an amount of from about 0.025% to about 2.0% on a dry weight basis.

The carboxylic containing compound utilized as the binder of the present invention may also comprise a copolymer of at least two different monomers or a salt of said monomers with at least one of said monomers having a monomer unit of the above described general formula —$(RCHCR'COOH)_n$—where R is hydrogen or carboxylic acid and R' is hydrogen or an alkyl group. Preferably, the monomer component of the copolymer may be selected from among polyacrylic acid, polymaleic acid, polymethacrylic acid, mixtures thereof, and salts thereof.

In one particularly preferred copolymer form, the binder comprises a copolymer of a sulfonated lignin material and one or more polymers or a salt of said one or more polymers having a monomer unit of the above general formula. Preferably, the polymer is selected from the group consisting of polyacrylic acid, polymaleic acid, polymethacrylic acid, mixtures thereof, and salts thereof. In :his form, which is a copolymer of a sulfonated lignin material, the binder may be incorporated with the animal feed in an amount of from about 0.025% to about 4.% on a dry weight basis.

The sulfonated lignin material may be selected from a lignosulfonate, a sulfonated lignin, and mixtures thereof. As used herein, the term "lignin" has its normal connotation, and refers to the substance which is typically recovered from alkali pulping black liquors, such as are produced in the kraft, soda and other well known alkali pulping operations. The term "sulfonated lignin," as used in the specification, refers to the product which is obtained by the introduction of sulfonic acid groups into the lignin molecule, as may be accomplished by reaction of the lignin with sulfite or bisulfite compounds. As used herein, the term "lignosulfonate" refers to the reaction product of lignin which is inherently obtained during the sulfite pulping of wood, straw, corn stalks, bagasse and the like, and is a principle constituent of the spent sulfite liquor which is derived from that process. Finally, the phrase "sulfonated lignin material" encompasses both sulfonated lignin and lignosulfonate hereinabove described. Additionally, it should be noted that the sulfonated lignin material may be in the form of sodium, potassium, calcium, lithium or ammonium salts without hindering its performance as a binder.

The copolymer binder of the present invention may be obtained by known copolymerization techniques. With respect to the copolymer binder of sulfonated lignin material, this binder is obtained by reacting the sulfonated lignin material with about 0.0125 to about 0.9 parts, per part of lignin material, of a polymer or salt of said polymer of the above noted general formula. For illustrative purposes, a suitable method for producing the sulfonated lignin material copolymer will be described by reacting sulfonated lignin material with acrylic acid to form the copolymer. As is apparent, other readily polymerizable compounds such as methacrylic acid, acrylates, and acrylonitrile may also be utilized. Therefore, a suitable method for producing the copolymer comprises, as a first step, forming an aqueous reaction mixture of a sulfonated lignin material and an acrylic monomer in a lignin monomer ratio of about 100:1.25 to about 100:90. Below these ratios the binder is generally insufficiently effective, and above these ratios the reaction mixture gels. An amount of ferrous sulfate (0.12% to about 1.0% by weight of lignin solids), as a catalyst, may be added to the lignin-monomer mixture and a pH of about 2.5 to 4.5 is established if necessary, with sulfuric or phosphoric acid as well as other acids as desired.

The mixture is then stirred with a mechanical stirrer for about 1 hour to dissolve the ferrous sulfate added. At the end of the stirring period, the required quantity of hydrogen peroxide (1.25% to about 5.0% by weight) is added to the mixture. The copolymerization is complete soon after the amount of hydrogen peroxide has been added (about 15 minutes). No external heating needs to be applied to the reaction mixture Alternately, if acrylonitrile is utilized instead of acrylic acid, subsequent hydrolysis of the reaction mixture with a caustic, for example, sodium hydroxide or potassium hydroxide is necessary to convert the nitrile groups to carboxylic groups.

In a method of compounding feed for animals in accordance with the present invention, the carboxylic containing compound utilized as a binder is incorporated with animal feed in an amount from about 0.025% to about 4.0% on a dry weight basis either in solid or aqueous form, and the mixture is then formed into a desired discrete shape for further processing and packaging. In general, these discrete shapes may be pellets, blocks or briquettes formed by known extrusion and/or compacting techniques. The particular processing technique utilized does not affect the performance of the carboxylic containing compound as a binder in the animal feed/binder mix.

Exemplary of the efficacy of the present invention are the following examples, wherein all parts and percentages specified are on a weight basis.

EXAMPLE 1

This example illustrates the ability of polyacrylic acid to render animal feed pellets less suseptible to abrasive degradation. Furthermore, this example illustrates binding response at a range of dosage of polyacrylic acid.

Egg Maker Complete, a product of Land O'Lakes AG Services, was purchased in meal form. The ration is a typical corn/soya mix. Guaranteed analysis includes:

| | |
|---|---|
| Crude Protein, not less than | 16.5% |
| Crude Fat, not less than | 2.5% |
| Crude Fiber, not more than | 4.5% |
| Calcium, not more than | 4.1% |
| Calcium, not less than | 3.1% |
| Phosphorus, not less than | 0.65% |
| Salt, not more than | 1.0% |
| Salt, not less than | 0.25% |

Sixty-four kilograms of the base meal mix were passed through a sample splitter 4 successive times to yield 16 identical batches of 4 kg each. Polyacrylic acid, molecular weight 250,000, was purchased from Aldrich Chemical Co. as a fine powder and applied to the feed in amount equivalent to 0, 2, 3, 4, and 5 lbs. per ton of feed. Feed was mixed for 1 minute in a V-blender equipped with a high-speed agitation bar. Treatments were replicated a minimum of three times and pelleted in a randomized order.

Pelleting was accomplished on a California Pellet Mill, Model CL Type 2, fitted with a 5/32" by 1-¼ die. Feed was conditioned with live steam (30 psi) to approximately 185° F. immediately before entering the press. Time in the conditioner was approximately 15 seconds. Treatments were run successively without interruption of process conditions between batches.

Pellets were immediately returned to room temperature by evaporative cooling under a stream of forced air. The first minute of each treatment was discarded to allow the mill to flush out all traces of the previous run. The remainder was retained and evaluated for pellet durability by ASAE Standard Method 269.1 modified to include two ¾ hex nuts in each chamber. Results are listed below.

| Fines reduction with varied levels of polyacrylic acid | | |
|---|---|---|
| Dosage, lbs/ton | Tumbler Fines, % | Reduction of Fines, % |
| 0.0 | 20.5 | 0.0 |
| 2.0 | 16.5 | 19.7 |
| 3.0 | 16.5 | 19.6 |
| 4.0 | 13.9 | 32.3 |
| 5.0 | 12.6 | 38.5 |

EXAMPLE 2

This example illustrates that polyacrylic acid is an effective binder over a wide range of molecular weights. Polyacrylic acids having molecular weights of 2,000, 5,000, 90,000 and 250,000 were purchased from Aldrich Chemical Co. The three lower molecular weight products were purchased as liquids, spray dried, and ground to pass through a U.S. No. 200 sieve. The resultant powders were applied to a level equivalent to 5 lbs/ton of feed. The feed was mixed, pelleted, and tested as in Example 1. Results are listed below.

| Effect of molecular weight on binding efficiency | | |
|---|---|---|
| Average Molecular Wt. | Tumbler Fines, % | Reduction of Fines, % |
| No Binder | 28.0 | 0.0 |
| 2,000 | 19.4 | 30.5 |
| 5,000 | 18.2 | 34.8 |
| 90,000 | 20.5 | 26.8 |
| 250,000 | 16.8 | 40.0 |

EXAMPLE 3

This example illustrates that salts of polyacrylic acid and modified polymers with a polyacrylic acid base are effective binding agents. Furthermore, polyacrylic acid products can provide binding performance equivalent to lignosulfonate pellet binders, but at much lower dosage levels, thereby qualifying as "low inclusion" binders.

Agesperse 80, a sodium salt of polymethacrylic acid distributed by CPS Chemical Co., was spray dried and ground to pass through a U.S. No. 200 sieve. Sokalan CP5, a polyacrylic acid-polymaleic acid copolymer powder, was aquired from BASF. These products were applied to feed at a rate equivalent to 5 lbs/ton. A third product, AmeriBond, a lignosulfonate powder manufactured by Reed Lignin Inc., was applied to feed at the recommended level of 25 lbs/ton. Treatments were mixed, pelleted, and tested as in Example 1. Results are listed below.

| Comparison of polyacrylic acid to lignosulfonate | | | |
|---|---|---|---|
| Binder | Dosage lbs/ton | Tumbler Fines, % | Reduction Of Fines, % |
| Control | 0 | 39.1 | 0.0 |
| Agesperse 80 | 5 | 28.7 | 26.6 |
| Sokolan CP5 | 5 | 25.4 | 35.0 |
| AmeriBond | 25 | 29.0 | 25.9 |

EXAMPLE 4

This example illustrates that polyacrylic acid is effective as a pellet binder when applied to feed as a liquid. A 25% solution of polyacrylic acid (molecular weight=5,000) was purchased from Aldrich Chemcial Co. for this example. Pelleting and durability testing were accomplished as in Example 1. Mixing was altered such that the binder was pumped into the steam supply line immdiately before the steam entered the conditioning chamber. Rate of application was adjusted to supply approximately 5 lbs of polyacrylic acid per ton of feed. Water was applied as a control binder. Under these conditions, polyacrylic acid was found to reduce fines by 24.4% versus pellets made with no binder but equivalent amounts of added water.

| Binding of polyacrylic acid solutions | | |
|---|---|---|
| Polyacrylic Acid, lbs/ton | Water lbs/ton | Tumbler Fines, % |
| 0 | 0 | 30 |
| 5 | 17 | 18 |
| 0 | 21 | 22 |

EXAMPLE 5

This example illustrates that polyacrylic acid products are more effective than carboxymethyl cellulose (CMC) at reducing fines generated by abrasive handling of pellets. Hercule's Cellulose Gum (7LF) is a CMC frequently used as a low inclusion binder in the feed industry In this example [t was compared directly against polyacrylic acids. AmeriBond, a calcium lignosulfonate, was included as a positive control. Mixing, pelleting, and testing were performed as in Example 1. Results are listed below.

| Comparison of low inclusion binders | | | |
|---|---|---|---|
| Binder | Dosage lbs/ton | Tumbler Fines, % | Reduction of Fines, % |
| Control | 0.0 | 34.8 | 0.0 |
| Hercule's Gum | 5.0 | 34.5 | 1.0 |
| Agesperse 80 | 5.0 | 29.8 | 14.5 |
| Sokolon CP5 | 5.0 | 25.3 | 27.3 |
| AmeriBond | 20.0 | 25.9 | 25.5 |

EXAMPLE 6

This example illustrates that the binding capacity of the polyacrylic products relates directly to the weight percentage of carboxy groups contained in the polymer. Polymers tested were:

Polyacrylic-polymaleic acid copolymer (PAM) supplied by BASF

Polyacrylic acid (PAA) supplied by Aldrich Chemical Co.

Polymethacrylic acid (PMA) supplied by CPS Chemical Co.

Polymethylmethacrylate (PMM) supplied by Aldrich Chemical Co.

Diisobutene-maleic copolymer (PCA) supplied by CPS Chemical Co.

Each polymer was added to the feed at a rate equivalent to 5 lbs/ton. Feed was mixed, pelleted, and tested as in Example 1. Due to the number of polymers to be tested, several replicate blocks of 16 treatments each were required. Responses are reported as percent fines reduction versus the control (no binder) within each block. The accelerated loss of response below 50% carboxylic acid content in PMM and PCA is likely caused by steric hindrance and reduced solubility imparted by the presence of additional methyl groups on the polymers.

| Percent fines reduction as a function of carboxylic acid content | | |
|---|---|---|
| Polymer | Carboxyls, % by weight | Reduction of Fines, % |
| PAM | 63–77 | 33 |
| PAA | 63 | 28 |
| PMA | 52 | 21 |
| PMM | 45 | 8 |
| PCA | 40 | 1 |

EXAMPLE 7

This example illustrates that the binding properties of lignosulfonates can be enhanced by copolymerization with acrylic acid, regardless of the liquor base or type of furnish. Two spent sulfite liquors were used in making the copolymer for this example, namely calcium base hardwood and ammonia base softwood. Thus 100 parts of the liquor solids (in 40% solution) were reacted with 30, 60 and 90 parts of acrylic acid at pH 3.5 using an initiator system of 2 parts of ferrous sulfate monohydrate and 2.5 parts of hydrogen peroxide. The resulting copolymers were dried and added onto the feed at a level equivalent to 10 lbs/ton. Treatments were mixed, pelleted and tested as in Example 1. Results are listed below.

| Binding effectiveness of lignosulfonate:acrylic acid copolymers | | |
|---|---|---|
| Ratio of | Tumbler Fines, % | |
| LS03:AA | Calcium | Ammonium |
| 10:0 | 18.4 | 17.0 |
| 10:3 | 15.1 | 15.1 |
| 10:6 | 10.8 | 9.2 |
| 10:9 | 9.1 | 9.4 |

EXAMPLE 8

This example illustrates that a low inclusion binder can be produced by copolymerization of calcium base spent sulfite liquor with acrylic acid. Thus, 100 parts liquor solids (in 40% solution) were reacted with 30 and 60 parts of acrylic acid at pH 3.5 using an initiator system of 2 parts of ferrous sulfate monohydrate and 2.5 parts of hydrogen peroxide. The resulting copolymers were dried and added onto the feed at a level equivalent to 5 lbs/ton. Treatments were mixed, pelleted and tested as in Example 1. Unreacted spent sulfite liquor (LS03) was added as powder to several batches at a rate equivalent to 20 lbs/ton, acting as a positive control. Results are listed below.

| Binding effectiveness of copolymers made from calcium lignosulfonate and acrylic acid | | |
|---|---|---|
| Treatment | Fines, % | Reduction of Fines, % |
| No Binder | 22.6 | 0.0 |
| LS03:AA (10:3), 5 lbs | 17.9 | 20.6 |
| LS03:AA (10:6), 5 lbs | 17.0 | 24.7 |
| LS03 unreacted, 20 lbs | 17.3 | 23.6 |

EXAMPLE 9

This example illustrates that the lignosulfonate:acrylic acid copolymer should be finely divided to maximize binding performance. Copolymer, LS03:AA (10:6), was prepared as described in Example 8, dried, and screened on a U.S. No 200 sieve. Material retained on the sieve was tested versus material that passed through the sieve. In each case, binder was mixed into the feed at a rate equivalent to 5 lbs/ton. Feed was conditioned to 180° F. prior to pelleting. Pellets were tested as in Example 1. Results are listed below.

| Effect of particle size on binding performance | | |
|---|---|---|
| Treatment | Fines, % | Reduction of Fines, % |
| No Binder | 20.2 | 0.0 |
| LS03:AA, >200 | 17.5 | 13.3 |
| LS03:AA, <200 | 15.6 | 22.5 |

EXAMPLE 10

This example illustrates that a lignosulfonate:maleic:acrylic copolymer is more effective than standard lignosulfonate as a pellet binder at the same treatment or dosage level. Thus, 100 parts of hardwood spent sulfite liquor solids (in 44% solution) were reacted with 26 parts of maleic acid and 4 parts of acrylic acid, and with 52 parts of maleic acid and 8 parts of acrylic acid at pH 3.5, using an initiator system of 0.4 parts of ferrous sulfate monohydrate and 8 parts of hydrogen peroxide. The resulting copolymers were dried and added onto the feed at a rate equivalent to 5 lbs/ton. Treatments were mixed, pelleted and tested as in Example 1. Results are listed below.

| Effect of particle size on binding performance | | |
|---|---|---|
| Treatment | Fines, % | Reduction of Fines, % |
| No Binder | 20.2 | 0.0 |
| LS03:AA, >200 | 17.5 | 13.3 |
| LS03:AA, <200 | 15.6 | 22.5 |

EXAMPLE 11

This example illustrates the ability of sodium polyacrylate to render animal feed pellets less suseptible to abrasive degradation. Furthermore, this example provides a comparison in binding responses between polyacrylate and two commercial feed binders, namely, AmeriBond and Production Aid Extra Strength, products of Reed Lignin Inc. and Cravac Industries, respectively.

Country Game & Turkey Grower, a product of Agway Inc., was purchased in meal form. Ingredients included grain products, plant protein products, animal protein products, processed grain by-products, and animal and vegetable fats. Guaranteed analysis includes:

| Effectiveness of LS03:MA:AA copolymers as binders | | |
|---|---|---|
| Ratio of LS03:MA:AA | Tumbler Fines, % | Reduction of Fines, % |
| No Binder | 20.8 | 0.0 |
| 100:0:0 | 18.7 | 10.1 |
| 100:26:4 | 17.7 | 14.9 |
| 100:52:8 | 17.0 | 18.4 |

| | |
|---|---|
| Crude Protein, not less than | 21.0% |
| Crude Fat, not less than | 3.0% |
| Crude Fiber, not more than | 4.5% |

Sixty-four kilograms of the base meal mix were passed through a sample splatter 4 successive times to yield 16 identical batches of 4 kg each. Sodium polyacrylate, specifically Colloid 116, was applied to the feed in amounts equivalent to 5 lbs per ton. Feed was mixed for 1 minute in a V-blender equipped with a high-speed agitation bar. In a similar manner, AmeriBond and Production Aid ES, were applied to feed as positive controls. Four replicates per treatment were pelleted and tested as described in Example 1.

| Effectiveness of sodium polyacrylate in a turkey grower feed | | | |
|---|---|---|---|
| Treatment | Dose, lbs/ton | Fines, % | Reduction of Fines, % |
| No Binder | 0.0 | 17.5 | 0.0 |
| Na Polyacrylate | 5.0 | 12.9 | 26.2 |
| Production Aid - ES | 5.0 | 14.6 | 16.6 |
| AmeriBond | 25.0 | 11.6 | 33.4 |

EXAMPLE 12

This example illustrates that sodium polyacrylate is an effective agent for reducing the percentage of fines occurring in corn pellets. Corn is a popular ingredient in most feedstuffs but it lacks natural binding properties. Any binder that is to be used in general application in the animal feed industry should effectively bind ground corn.

Sodium polyacrylate (Colloid 213) was applied to ground corn meal at a rate equivalent to 5 lbs/ton. Feed was mixed for 1 minute in a V-blender equipped with a high-speed agitation bar. In a similar manner, AmeriBond was added at a rate equal to 25 lbs/ton and mixed for use as a positive control. Treatments were randomized and pelleted at 180° F. Four replicates were used per treatment. The resultant pellets were returned to room temperature by evaporative cooling under a stream of forced air. Pellet durability was determined by ASAE Standard 269.1. Results are listed below.

| Effectiveness of sodium polyacrylate in corn pellets | | | |
|---|---|---|---|
| Treatment | Dose, lbs/ton | Fines, % | Reduction of Fines, % |
| No Binder | 0.0 | 38.4 | 0.0 |
| Polyacrylate | 5.0 | 30.5 | 20.6 |

-continued

Effectiveness of sodium polyacrylate in corn pellets

| Treatment | Dose, lbs/ton | Fines, % | Reduction of Fines, % |
|---|---|---|---|
| AmeriBond | 25.0 | 23.6 | 38.7 |

Various modes of carrying out the invention are contemplated as being within the scope of the following claims particularly pointing out and distinctly claiming the subject matter which is regarded as the invention.

I claim:

1. A method of compounding feed for animals, comprising the steps of:
   providing an organic animal feed;
   incorporating with said animal feed an effective amount of a binder to form a feed mixture, said binder selected from the group consisting of a polymer or salt of said polymer which includes a carboxylic containing compound having a monomer unit of the general formula—$(RCHCR^1COOH)_n$—where R is hydrogen or a carboxylic acid and $R^1$ is hydrogen or an alkyl group, and a copolymer of a sulfonated lignin material and a monomer, polymer or polymer salt which includes a carboxylic containing compound having a monomer unit of said general formula; and
   forming said mixture into a desired discreet shape.

2. The method of claim 1 wherein said carboxylic containing compound is a polymer selected from the group consisting of polyacrylic acid, polymaleic acid, polymethacrylic acid, mixtures thereof, and salts thereof.

3. The method of claim 2 wherein from about 0.025% to about 2.0% on a dry weight basis of said compound is incorporated with said animal feed.

4. The method of claim 1 wherein from about 0.025% to about 4.0% on a dry weight basis of said compound is incorporated with said animal feed.

5. The method of claim 1 wherein said polymer or polymer salt of said copolymer is selected from the group consisting of polyacrylic acid, polymaleic acid, polymethacrylic acid, mixtures thereof, and salts thereof.

6. The method of claim 1 wherein said sulfonated lignin material is selected from a group consisting of a lignosulfonate, a sulfonated lignin, and mixtures thereof.

7. The method of claim 6 wherein said sulfonated lignin material is in the form of a sodium, potassium, calcium, lithium or ammonium salt.

8. The method of claim 1 wherein said discrete shape is formed by extruding said mixture.

9. The method of claim 1 wherein said discrete shape is formed by compacting said mixture.

10. The method of claim 1 wherein said binder is in an aqueous form and is incorporated with said animal feed by being sprayed thereon.

11. An animal feed composition, comprising:
    a protein-containing organic meal; and
    an effective amount of a binder for promoting cohesion of said meal, said binder selected from the group consisting of a polymer or salt of said polymer which includes a carboxylic containing compound having a monomer unit of the general formula—$(RCHCR^1COOH)_n$—where R is hydrogen or a carboxylic acid and $R^1$ is hydrogen or an alkyl group, and a copolymer of a sulfonated lignin material and a monomer, polymer or polymer salt which includes a carboxylic containing compound having a monomer unit of said general formula.

12. The composition of claim 11 wherein said carboxylic containing compound is a polymer selected from the group consisting of polyacrylic acid, polymaleic acid, polymethacrylic acid, mixtures thereof, and salts thereof.

13. The composition of claim 12 wherein from about 0.025% to about 2.0% on a dry weight basis of said compound is incorporated with said animal feed.

14. The composition of claim 11 wherein said polymer or polymer salt of said copolymer is selected from the group consisting of polyacrylic acid, polymaleic acid, polymethacrylic acid, mixtures thereof, and salts thereof.

15. The composition of claim 11 wherein from about 0.025% to about 4.0% on a dry weight basis of said compound is incorporated with said animal feed.

16. The composition of claim 12 wherein said sulfonated lignin material is selected from a group consisting of a lignosulfonate, a sulfonated lignin, and mixtures thereof.

17. The composition of claim 16 wherein said sulfonated lignin material is in the form of a sodium, potassium, calcium, lithium or ammonium salt.

18. An animal feed composition comprising:
    a protein-containing organic meal; and
    an effective amount of a binder for promoting cohesion of said meal, said binder selected from the group consisting of a polymer or salt of said polymer which includes a monomer unit having at least about 50% by weight carboxylic groups, and a copolymer of a sulfonated lignin material and a monomer, polymer or polymer salt which includes a monomer unit having at least about 50% by weight carboxylic groups.

* * * * *